United States Patent
Dam et al.

(10) Patent No.: US 6,832,516 B1
(45) Date of Patent: Dec. 21, 2004

(54) INTEGRAL ULTRASONIC LIQUID LEVEL CONTINUOUS TRANSMITTER WITH INDEPENDENT HIGH-LEVEL DISCRETE ALARM POINT LEVEL

(75) Inventors: Naim Dam, Muttontown, NY (US); William Allhusen, Bethpage, NY (US); Glen Melder, Lake Ronkonkoma, NY (US)

(73) Assignee: Cosense, INC, Hauppauge, NY (US)

( * ) Notice: Subject to any disclaimer, the term of this patent is extended or adjusted under 35 U.S.C. 154(b) by 0 days.

(21) Appl. No.: 10/679,236

(22) Filed: Oct. 3, 2003

(51) Int. Cl.$^7$ ............................................. G01F 23/284
(52) U.S. Cl. .................. 73/290 V; 73/290 R; 340/620; 340/621
(58) Field of Search .......................... 73/290 V, 290 R; 340/621, 620

(56) References Cited

U.S. PATENT DOCUMENTS

| | | | | |
|---|---|---|---|---|
| 4,458,735 A | * | 7/1984 | Houman | 141/95 |
| 4,944,335 A | * | 7/1990 | Stembridge et al. | 141/95 |
| 4,944,336 A | * | 7/1990 | Stembridge et al. | 141/95 |
| 5,036,892 A | * | 8/1991 | Stembridge et al. | 141/1 |
| 5,155,472 A | * | 10/1992 | Dam | 340/621 |
| 5,195,058 A | * | 3/1993 | Simon | 367/87 |
| 5,337,289 A | * | 8/1994 | Fasching et al. | 367/140 |
| 5,663,503 A | * | 9/1997 | Dam et al. | 73/649 |
| 5,735,166 A | * | 4/1998 | Dam | 73/290 V |
| 5,808,200 A | * | 9/1998 | Dam | 73/610 |
| 6,053,041 A | * | 4/2000 | Sinha | 73/290 V |
| 6,142,015 A | * | 11/2000 | Getman et al. | 73/290 V |
| 6,263,731 B1 | * | 7/2001 | Getman et al. | 73/290 V |
| 6,539,794 B1 | * | 4/2003 | Otto et al. | 73/290 V |
| 6,631,639 B1 | * | 10/2003 | Dam et al. | 73/290 V |

* cited by examiner

*Primary Examiner*—Hezron Williams
*Assistant Examiner*—Rodney Frank
(74) *Attorney, Agent, or Firm*—Gordon D. Coplein

(57) ABSTRACT

An ultrasonic liquid level sensor instrument that combines a continuous transmitter that transmits though the air for measuring the level of liquid in a vessel on a continuous basis and a point level sensor that sets a high level alarm. The continuous level transmitter/receiver provides a continuous measurement of the liquid level in the vessel and the point level sensor is used for sensing an overflow, or high level condition in the vessel, as well as failure of the continuous transmitter/receiver. The instrument includes a sensor fixture that holds both the continuous air transmitter/receiver transducer and the point level sensor. The fixture is mounted in a single hole in the wall of a tank or a vessel in which the liquid level is being monitored. Each of the continuous level transmitter/receiver and point level sections of the instrument has a self check capability.

15 Claims, 3 Drawing Sheets

INTEGRAL ULTRASONIC LIQUID LEVEL CONTINUOUS TRANSMITTER WITH INDEPENDENT HIGH-LEVEL DISCRETE ALARM POINT LEVEL

FIELD OF THE INVENTION

The invention relates to an ultrasonic liquid level sensor instrument that combines a continuous transmitter that transmits though the air for measuring the level of liquid in a vessel on a continuous basis and a point level sensor that sets a high level alarm.

BACKGROUND OF THE INVENTION

Ultrasonic instruments for measuring the level of liquid in a vessel are well known. Included among the type currently used is the so-called air transmitter in which an ultrasonic transmitter/receiver transducer is located in a vessel at a certain height and transmits ultrasonic energy through the air to the liquid level surface. The time measured between the transmission and return of the ultrasonic energy is used to compute the distance from the transducer to the liquid level.

While such air type ultrasonic transmitter systems are quite serviceable, a problem arises where the level of the liquid in the vessel rises above the level of the transducer or the transducer fails. When either of such events occurs, the system has no way to determine the failure and there is no way to produce a signal to indicate such failure condition.

A problem of this type is found in an aircraft sanitary tank system having a receiving vessel which contains different kinds of wastes and liquid. Present systems in aircraft use a differential pressure transducer to continuously monitor the liquid level in the vessel. However, due to the dirty nature of the liquid, even when the vessel is not over-filled, the pressure sensing tube sometimes gets plugged. This causes false alarms to which service people must respond to service the tank when the aircraft is on the ground. Such false alarms are expensive to respond to in order to clean-up and repair. This presents a problem, particularly when maintenance must be provided on an expedited basis in order to maintain flight schedules, and increase maintenance costs.

BRIEF DESCRIPTION OF THE INVENTION

The present invention relates to an ultrasonic instrument, which combines both an air type continuous level ultrasonic transmitter/receiver together with a gap type point level ultrasonic sensor. The continuous level transmitter/receiver provides a continuous measurement of the liquid level in the vessel and the point level sensor is used for sensing an overflow, or high level condition in the vessel. Each of the continuous transmitter/receiver and point level sections of the instrument has a self test capability.

The instrument of the invention includes a sensor fixture that holds both the continuous air transmitter/receiver transducer and the point level sensor. The fixture is mounted in a single hole in the wall of a tank or a vessel in which the liquid level is being monitored. In a preferred embodiment of the invention the continuous ultrasonic transducer transmitter/receiver is at the top of the fixture for transmitting ultrasonic energy through the air to the surface of the liquid during normal operation. The point level sensor of the fixture is formed by an air gap type ultrasonic transducer, preferably located below the continuous energy transducer, to sense an over-flow condition, i.e., when the liquid rises near to, but below, the level of the continuous air type transmitter/receiver transducer.

In accordance with the invention, the arrangement provides for both continuously measuring the distance from the instrument to the top of the liquid level i.e., to measure the level of the liquid in the tank, as well as an alarm system to sense when there is an overflow or failure of either of the continuous sensor or the point level sensor. Since the fixture uses a single hole for mounting as compared to existing three hole systems, that have one hole for the air transmitter and two for the point level sensor, the costs of mounting and the number of leak points in the sanitary tank are reduced.

BRIEF DESCRIPTION OF THE DRAWINGS

Other objects and advantages of the present invention will become more apparent upon reference to the following specifications and annexed drawings, in which.

DETAILED DESCRIPTION OF THE INVENTION

Figure 1A:
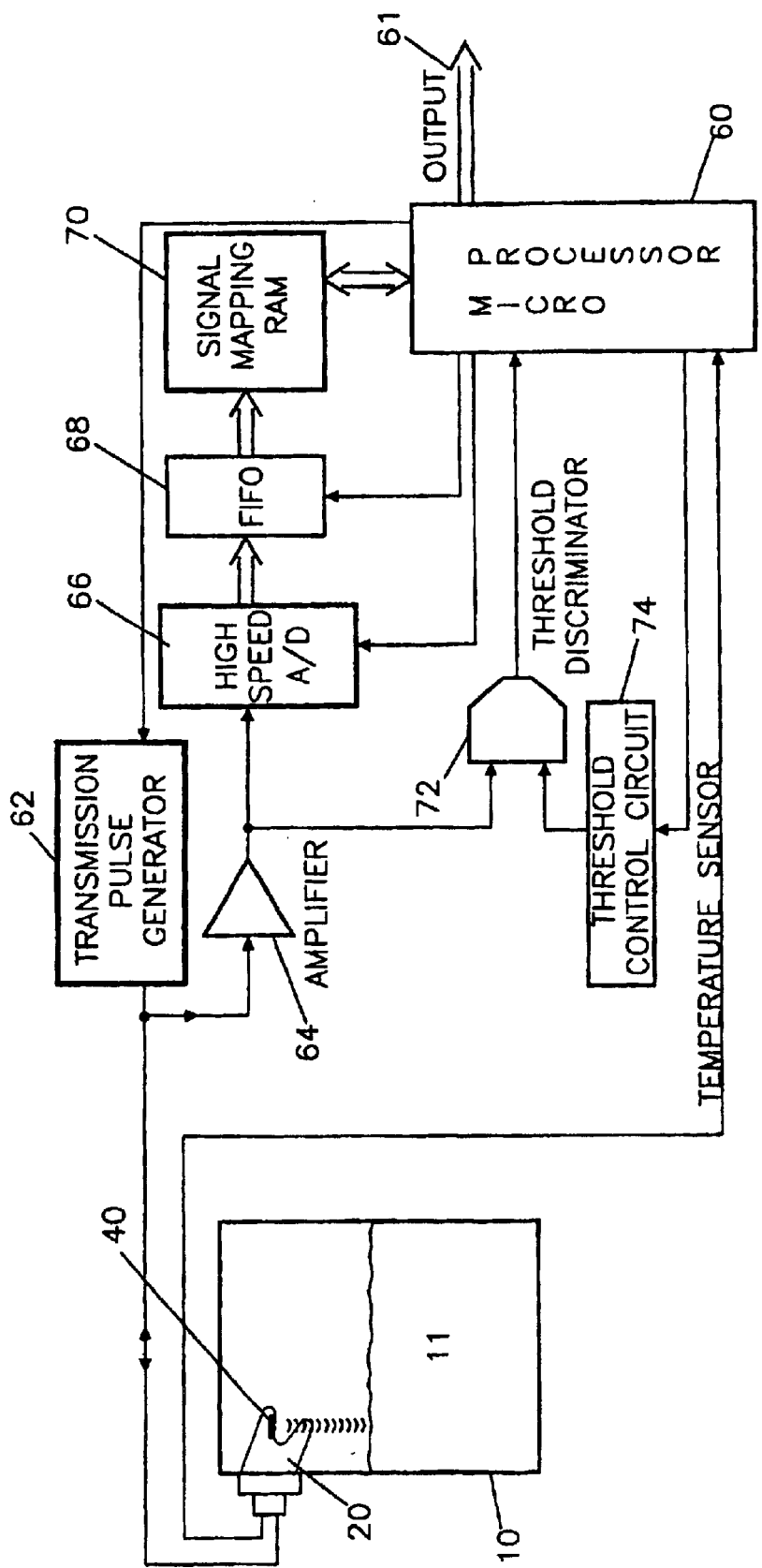
FIG. 1A is a schematic diagram of the continuous level measuring section of the instrument.

FIG. 1A shows a tank or vessel 10 that contains a liquid 11. In an aircraft sanitary tank application, the liquid often contains human waste solids. The vessel 10 is shown as having a closed top, which is usually found in an aircraft sanitary tank application, although the invention can be used with open top vessels. A fixture 20, hereafter called the sensor fixture and whose details are described below, is mounted to the wall of vessel 10 through a single hole.

Figure 3:
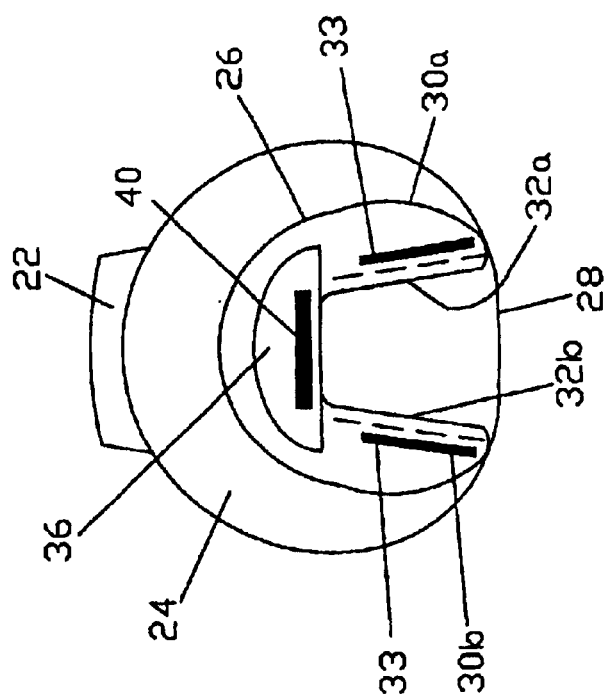
FIG. 3 is a front view of the sensor fixture.
Figure 2:
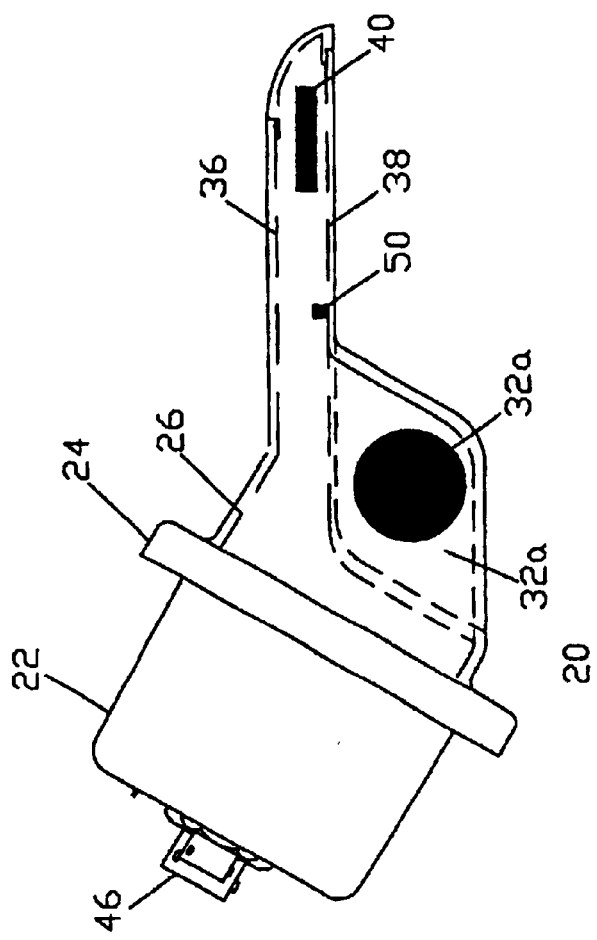
FIG. 2 is an elevational view of the sensor fixture.

Referring to FIGS. 2 and 3, the sensor fixture 20 has a main body 22 and a flange 24 which rests against the outer surface of the vessel wall and is used to fasten the fixture 20 to the wall by any suitable means, such as screws, an epoxy adhesive etc. A packing member or washer (not shown) is preferably used between the flange 24 and the vessel wall.

The fixture 20 has a part circular section 26 that fits into the vessel mounting hole and extends from the flange 24 into the vessel interior. The section 26 has an opening 28 at its bottom so as to effectively define a pair of arms 30a and 30b that extend from the body 22. The arms 30a and 30b have respective flat opposing inner faces 32a and 32b. There is a gap between the two opposing inner faces 32a and 32b which are substantially parallel to each other. An ultrasonic transducer element 33, for example a piezoelectric material such as PZT, is mounted in each of the arms 30a and 30b with the two elements 33 each having a flat face and with the element flat faces being generally parallel to each other. The transducer elements 33 are of suitable size and shape cut to operate at a desired frequency. As explained below, the two transducer elements 33 are part of a liquid point level sensor.

An elongated arm 36 extends outwardly from the upper part of the fixture part circular section 26 above the arms 30a and 30b. The arm 36 also extends outwardly of the ends of the point level sensor support arms 30a and 30b. The elongated arm 36 is at a suitable angle such that its bottom face 38 will be generally parallel to the upper surface of the liquid 11 in the vessel 10. The arm 36 is the support for the continuos level transducer. An ultrasonic transducer element 40, such as a PZT piezoelectric crystal, is mounted in the extending upper arm 36 near its distal end. The element 40 is at a known height from the bottom of vessel 10. As described below, the element 40 is used as the sensing element for a continuous measurement of the height of the liquid 11 in vessel 10. Since the transducer element 40 is spaced outwardly of the arms 30a and 30b for the point level transducer, the energy from the continuous transmitter to the surface of the liquid is unobstructed.

Leads, not shown, are embedded in the fixture arms 30 and 36 from each of the transducer elements 33 and 40. The leads extend into the fixture base 22 that is outside of the vessel. In a preferred embodiment of the invention, the base 22 houses the electronic components of the instrument, as described below. There is a terminal block 46 on the outer end of the fixture base 22 that provides connections to supply electrical power to the electronic circuitry within the base 22 and also connections to external elements such as a display that indicates the liquid level and an alarm, which can be either visual or audible.

When the fixture 20 is mounted to the vessel wall, the plane of each of the two elements 33 will be generally perpendicular to the liquid 11 in the vessel 10. The plane of the element 40 in the extending arm 36 will be substantially parallel to the top surface of the liquid body 11. In a typical embodiment of the sensor fixture 20, the arms 30a and 30b extend outwardly about 2 inches from the flange 24 and the arm 36 extends outwardly for about 4 inches. Any suitable dimensions can be used depending upon the particular application, the size of the vessel 10, etc. The fixture 20 is preferably of one piece molded construction of a suitable material such as a plastic, epoxy or another type of plastic such as TEFLON, etc.

The following explains the operation of the continuous sensor that includes the transducer element 40. The velocity of transmitting ultrasonic energy through air or a partial vacuum is computed by using equation:

$$Vt = Vo \sqrt{1+t/273} \qquad (1)$$

where:

Vo=Velocity of sound at 0° C.=331.3 meter/sec

Vt=Velocity of sound at temperature t in degrees C.

Vt=Velocity of sound at 20° C.=343.2 meter/sec.

In the instrument of the invention, the ultrasonic energy from the transducer element 40 is transmitted through the gas medium (air or partial vacuum) in the vessel 10. The energy reflected from the gas medium/interface at the top of the liquid body travels back to the transducer element 40 from the interface. The round trip transit time of the ultrasonic energy is measured by using the following formula from which the height of a liquid is calculated.

$$Vt = 2I/T \qquad (2)$$

where:

I=measuring distance

T=transit time

Thus, the distnce I can be computed by determining the round trip transit time of the ultrasonic energy from the tranmitting/receiving element 40 and its return to the element after reflection from the air/liquid interface. Since the height h of the element 40 from the bottom of the vessel is known, the height L of the liquid body, or liquid level, is:

$$L = h \cdot I \qquad (3)$$

A problem that can arise in the accuracy of an ultrasonic sensor is caused by various external factors, such as temperature, pressure and humidity. The measured round trip time using a transducer that transmits through the air is not as accurate as a direct measurement of liquid body level or interface height. It therefore becomes desirable to provide an arrangement to compensate for such change of at least the external temperature factor to provide correction to the measured time. In the present invention an integral temperature sensor 50 is provided. This can be mounted at any suitable location on the fixture 20, such as mounted in the arm 36. The temperature sensor is any suitable well known device such as a semiconductor temperature sensor, a thermistor, etc. The sensor 50 measures temperature within the vessel and produces a signal used to provide correction for the velocity of the ultasonic energy in the air in the vessel so as to ensure accurate computation of the distance between the element 40 and the surface of the liquid body 11.

In a preferred embodiment of the invention the continuous sensor is designed to increase the efficiency of an ultrasonic sensor in a partial vacuum and highly foamy liquid such as encountered in an aircraft waste tank. A ring type of ultrasonic sensor is preferred having a resonant frequency $$Fr = \frac{N}{(a-b)} \qquad (4)$$

where:

N=a constant in KHZ-mm a=outer radius of multi piezo elements b=inner radius of multi piezo elements A sensor of this type has a directivity of beam that can be made very narrow. For example, at an operating frequency of the ultrrasonivc energy of about 75–50 KHZ the main beam will have side lobes that are only about −6 db below the main lobe.

FIG. 1A shows the circuit of the instrument with the upper part being the continuous measuring section and the lower part being the point level section. The instrument includes a conventional microprocessor 60 which is suitably programmed to control the operation of the instrument and also to perform the necessary calculations for the continuous level sensor. The microprocessor 60 has an output that is applied to a pulse generator 62 which produces a pulse of ultrasonic energy that is applied to the element 40 in the upper arm 36 of the fixture 20. The ultrasonic energy is, as shown, transmitted downwardly to the air/liquid interface of the liquid 11 in the vessel 10.

The microprocessor 60 is programmed to cause production the pulses from the generator 62 on a periodic basis with enough time between any two successive pulses for the energy reflected from the air/liquid interface to be returned to the element 40 and for the microprocessor 60 to make the measuement of the round trip time of the energy and to calculate the liquid level height. When the fixture 20 is mounted to the vessel wall the height of the transducer element 40 from the bottom of the vessel is known. The calculation performed by the microprocessor is to determine the distance I between the element 40 and the liquid/air interface and to subtract this distance from the known distance h of the element 40 to the bottom of the vessel to determine tye height L of the liquid level body 11.

The energy reflected from the air/liquid interface is converted to an electrical signal by the transducer element 40 and the signal is applied to to an amplifier 64 which is preferably of the high gain type. One output and of the amplifier 64, which is an analog signal, is applied to the input of a high-speed analog/digital converter 66. The analog/digital converter 66 is gated on by a signal from the microprocessor 60 at the time when the energy reflected from the air/liquid interface is to be received and it converts the analog signal from the amplifier 64 into digital form. The output of the analog/digital converter 66 is a digital representation of the received energy.

The microprocessor 60 operates in a manner such that a number of pulses are produced by generator 62 and transmitted by the element 40 to the air/liquid interface during a given time interval. A digital representation is formed by the analog digital converter 66 for each such pulse returned from the air/liquid interface. The output of the analog/digital converter 66 is applied to and stored in a memory array 68, preferably of the first in-first out type. The memory 68 is also gated on by a control signal from the microprocessor 60 for the measurement time interval that covers the pulses produced during the time interval. The memory stores the digital value of each returned signal as a sample.

The output of the memory 68 is applied to a signal mapping circuit 70 which selects from the digital samples stored during a measurement interval the digital sample that corresponds to the largest amplitude of the reflected signal. This will be the most reliable value due to conditions that might exist at the air/liquid interface. That is, the interface sometimes is somewhat foamy and the maximum amplitude signal is the most reliable indication of the distance between the transducer element 40 and the air/liquid interface. The signal mapping circuit 70 can be part of the microprocessor 60 or can be a separate circuit, such as a conventional digital signal processor that has been suitably programmed.

The output of the signal mapping circuit 70 is applied to the microprocessor 60 which makes the necessary calculation of the distance between the transducer element 40 and the air/liquid interface based upon the time measured between the transmission of the signal from the element 40 and time for the reflected signal to be returned. From this calculation the height L of the body of liquid 11 in the vessel 10 is determined as explained above.

The microprocessor 60 also receives a signal from a temperature sensitive element 50 that is mounted in the fixture 20. The data form the temperature signal is used to modify the calculation made by the microprocessor 60 to correct the temperature effect on the transit time on the energy transmitted from and received by the transducer element 40.

The continuous circuit also includes a threshold control circuit 74. The threshold control circuit 74 sets a minimum amplitude level of the signal reflected from the air/liquid interface that is acceptable for processing by the microprocessor 60. The level set by the control circuit 74 is applied to one input of a threshold discriminator circuit 72, which is a comparator type circuit, whose other input is the output of the high gain amplifier 64. The section of the microprocessor 60 that is used to perform the height level calculation is activated only if the minimum threshold is exceeded.

The microprocessor 60 also has an output 61 of a conventional type, such as 4–20 ma current or 0–10 volts. These output signals are used for conventional dispaly, alarm and control devices, as is well-known.

In the continuous mode of operation of the system, pulses of ultrasonic energy from the driver circuit 62 are transmitted by the piezo element 40 in response to a transmit switch which is gated on by a command signal from the microprocessor 60. After the sensor element 40 transmits the ultrasonic energy through the gaseous medium in the vessel 10 the microprocessor 60 sends a command signal as a transmit/receive switch to open the transmitter path from the element 40 to the amplifier 64. The ultrasonic energy received from air/liquid interface is amplified by the amplifier 64 and then digitized by the high speed A/D converter 66. The digital result is stored in memeory 68 for two dimensional mapping by the microprocessor 60. The digital data produced by the high speed A/D converter 64 computes the signature of the received signal, even in a foamy, vacuum and highly noisy environment, to provide for more accurate measurement of the liquid level in vessel 10.

A self-test capability is provided to the circuit of FIG. 1A in the following manner. When the piezoelectric element 40 is operating in the transmitting mode, some of the ultrasonic energy will impinge on a part of the structure of the fixture 20 and be refleceted back to the element. This is sometimes known as the ringing or dead zone of the sensor. Such energy reflected from the fixture 20 will be received by the element 40 before the energy reflected from the gas/liquid interface 11. A time window for this earlier returned energy can be set by the microprocessor 60 to occur each measurement interval or on a periodic basis. If in the time window no energy reflected from the fixture is detected, this is an indication that the element 40 has become totality or partially disbanded. That is, the continuous level transducer has failed. The microprocessor 60 also can be programmed to provide an indiction of the transducer failure.

The above described part of the instrument that makes the continuous measurement has an advantage in that a non-contact liquid level measurement is made using ultrasonic energy. This is an attractive alternative to contact type measurement systems since all problems of cross-contamination and malfunction of a sensor element due to being plugged up are avoided because the liquid and contaminating solids never touches the sensor.

Figure 1B:
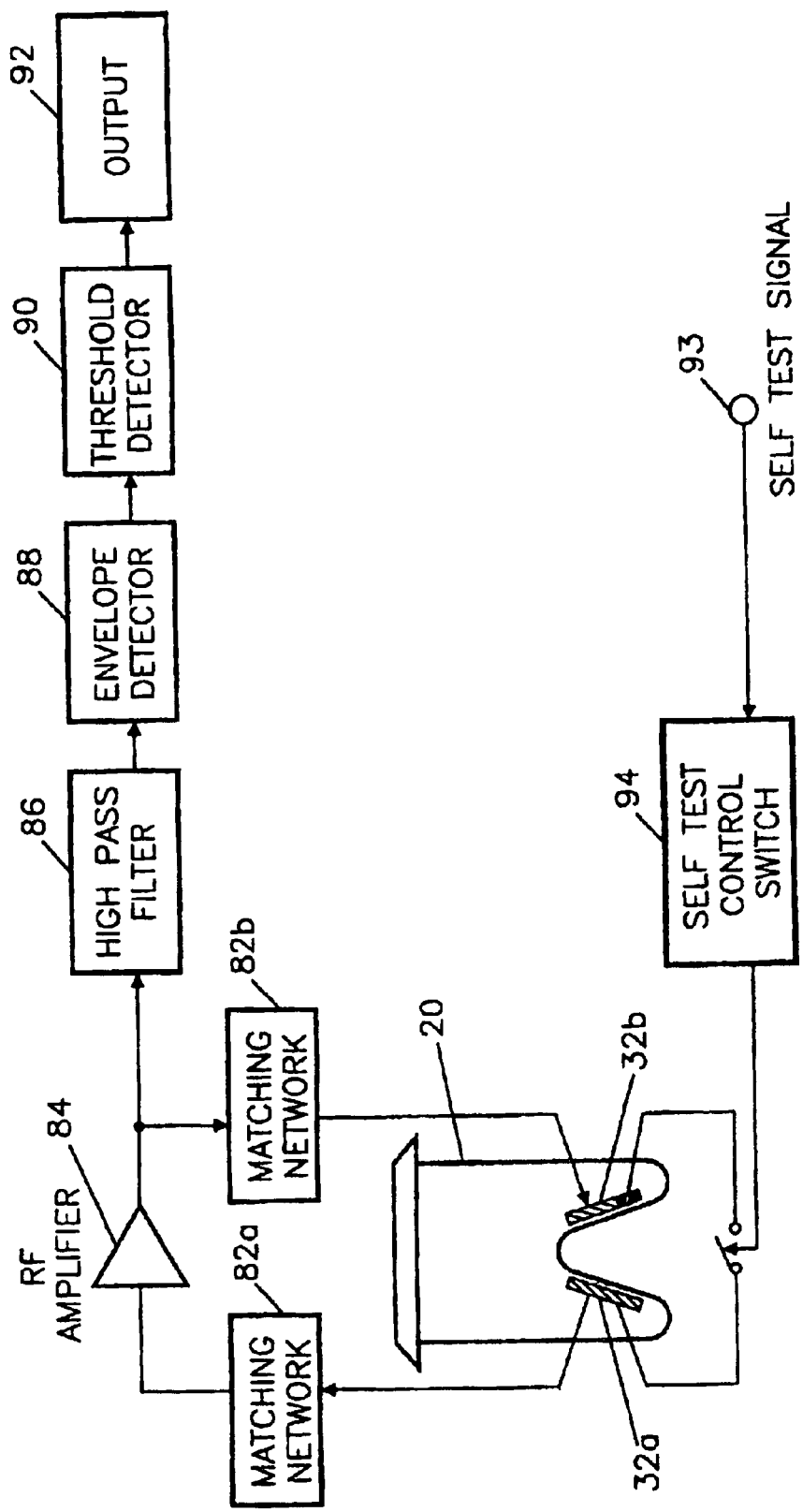
FIG. 1B is a schematic diagram of the point level measurement section of the instrument.

FIG. 1B shows the point level measurement portion of the instrument. As explained above, in a preferred embodiment of the invention, all of the instrument electronic circuitry is mounted in the fixture 20 so as to be compact. In the preferred embodiment of the invention, a continuous wave, closed loop oscillator type circuit is used to form the point the point level sensor. The loop is formed by the piezoelectric elements 33 in the arms 32a and 32b. Each element 33 is connected by a respective matching network 82a and 82b to the output and input of a high gain amplifier 84. Each matching network 82 can be a resitor or other impedance element such as an inductoror, capacitor or combination of these elements. The matching networks are also preferably housed in the fixture 20. The presence of liquid in the space between the two elements 33 in the arms 32a and 32b causes the loop gain to exceed unity and when the loop phase shift is an integral number of $2\Pi$ radians the loop will oscillate and produce an output signal. That is, the presence or absence of oscillation in the loop determines whether liquid is present or absent in the sensing gap.

The loop oscillates at a particular frqequency, which is primarily determined by the construction of the transducer formed by the two piezoelectric elements 33 and the matching networks. It is preferred that the transducer have a high Q so that the frequency of the loop oscillation will be stable. A freqency of 1 Mhz has been found to be satisfactory. The output of the loop is applied to the input of a high pass filter 86 that will pass the oscillation signal and then to an envelope detector 88 which detects the peak amplitude of the signal. The signal from the output of the detector 88 is applied to a threshold detector 90 which sets a minimum signal level so that the instrument will discriminate against false alarms. The output of the threshold detector 90 is applied to an output circuit 92 which can be any suitable display or alarm device or a signal of the same type as the output 61 of the microprocessor 60.

The point level portion of the instrument also has a self-test capability to check for failure of sensor components. This includes the piezoelectric crystals 33 in the arms 32a and 32b and the associated electronics. Self-test is performed by a demand self-test input. When demand self-test goes high (logic level 1), an electronic switch 94 closes and connects the piezoelectric elements 33. This closes the loop and simulates a wet condition to test the rest of the associated electronic components. The demand can be made by a manual switch or else programmed by the microprocessor 60 to be accomplished periodically.

Specific features of the invention are shown in one or more of the drawings for the convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within thin the patented scope of the appended claims.

We claim:

1. An instrument for measuring the level of a liquid body in a vessel, comprising:
   a first transducer mounted to said vessel at a known distance from the vessel bottom for transmitting ultrasonic energy through a gaseos medium to a gas liqid interafce of the body and for receiving ultrasonic energy reflected back from the interface;
   a circuit for producing ultrassonic energy that is supplied to said first transducer and for calculating the height of the liquid body based on the round trip transit time of the ultasonic energy from said first transducer to the intrface and the return of the reflected enegy and the known distance to the bottom of the vessel; and
   a second transducer set at a pedetermined height above the bottom of the vessel for sensing the presence of liquid in the vessel reaching the predetermined height.

2. An instrument as claimed in claim 1 further comprising a fixture on which said first and second transducers are mounted.

3. An instrument as claimed in claim 2 wherein said fixture comprises a first body portion that passes though a hole in the wall of the vessel and a main body portion that extends within the vessel.

4. An instrument as claimed in claim 3 wherein said fixture main body protion comprises a first arm extending therfrom inwardly of the vessel, said first transducer mounted to said first arm.

5. An instrument as claimed in claim 4 wherein said fixture main body portion futher comprises a second arm extending therefrom inwardly of the vessel, said second transducers mounted to said second arm.

6. An instrument as claimed in claim 5 wherein said second arm is located below said first arm.

7. An instrument as claimed in claim 6 wherein said first arm is located above said second arm and extends further inwardly of the vessel than said second arm.

8. An instument as claimed in claim 4 wherein said fixture main body portion further comprises a pair of spaced second arms, a said second transducer mounted in each of said pair of second arms.

9. An instrument as claiemd in claim 8 wherein said pair of second arms is located below said first arm.

10. An instrument as claimed in claim 9 wherein said first arm extends further inwardly of the vessel than said pair of second arms.

11. An instrument as claimed in claim 8 further comprising a detection circuit connected to said second transducers of said scond arms that provides an indication when liquid enters the space between said pair of second arms.

12. An instrument as claimed in claim 11 wherin the indication provided by said detection ciruit is oscillation of said detection circuit.

13. An instrument as claimed in claim 2 wherein said circuit further comprises means for detecting the presence of energy reflected from said fixture main body at a time before energy is reflected from the liquid body gas liquid interface received by said first transducer to determine proper opertion of said first transducer.

14. An instrument as claimed in claim 11 further comprising means for connecting each of said two second transducers together to simulate the presence of liquid in the space between said two second arms and thereby test the operation of said two second transducers.

15. An instrument as claimed in claim 13 further comprising means for connecteing each of said two second transducers together to simulate the presence of liquid in the space between said two second arms and thereby test the operation of said two second transducers.

* * * * *